B. MOAD.
AUTOMOBILE SIGNAL.
APPLICATION FILED AUG. 25, 1917.
1,277,335.
Patented Aug. 27, 1918.
2 SHEETS—SHEET 2.
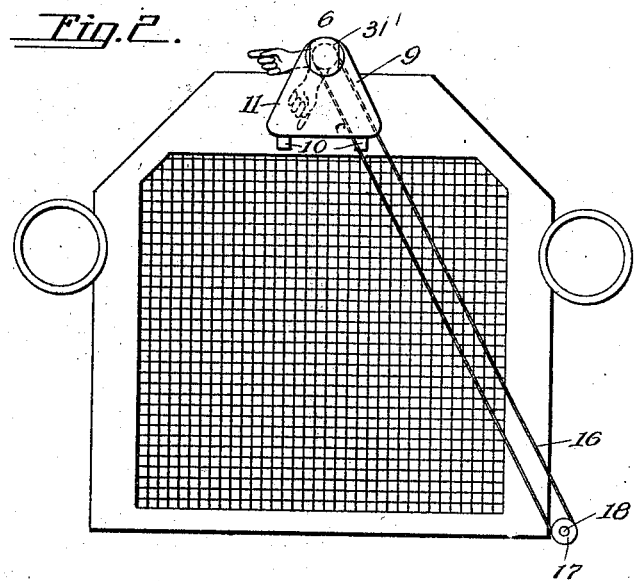
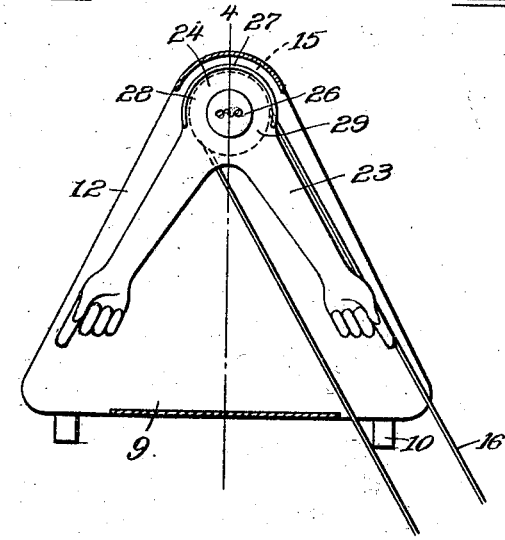
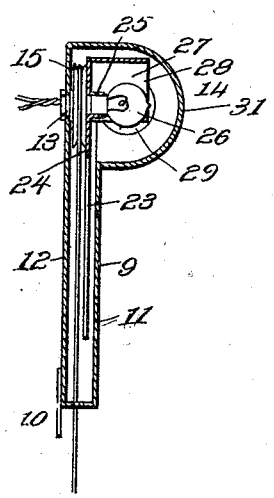
Inventor
Buren Moad.
Witness
By Victor J. Evans
Attorney

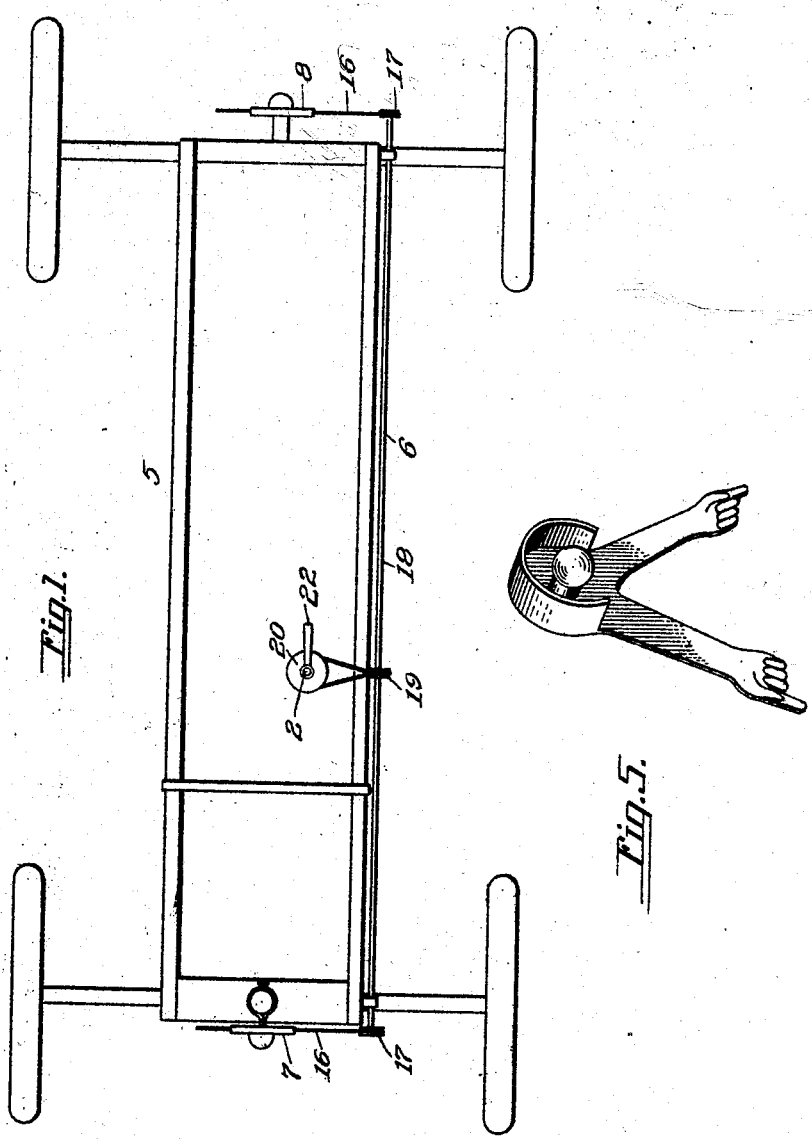

UNITED STATES PATENT OFFICE.

BUREN MOAD, OF TOLEDO, OHIO.

AUTOMOBILE-SIGNAL.

1,277,335.　　　　Specification of Letters Patent.　　Patented Aug. 27, 1918.

Application filed August 25, 1917.　Serial No. 188,141.

*To all whom it may concern:*

Be it known that I, BUREN MOAD, a citizen of the United States, residing at Toledo, in the county of Lucas and State of Ohio, have invented new and useful Improvements in Automobile-Signals, of which the following is a specification.

This invention relates to signals generally, comprehending particularly motor vehicle signals of that type designed to indicate to the driver of a car in the rear that the driver of the car ahead is contemplating turning either to the right or to the left, thus avoiding rear end collisions.

An object of the invention is the provision of an indicator of the above stated character wherein an arm is supported for horizontal swinging movement on both the front and rear ends of the car and manually controlled means arranged in convenient position with respect to the driver of the car, whereby the signal at the front of the car and the signal at the rear end of the car may be simultaneously operated in order that those in front of the vehicle as well as parties in rear of the vehicle will be warned as to whether a turn is about to be made.

Further, I aim in providing a novel construction of visible signal, whereby the rays of light will be deflected thereon upon the manipulation of the signal arm to indicating position.

With the above and other objects in view, the invention consists in the novel features, details of construction and combination of parts which will hereinafter be more fully set forth, illustrated in the accompanying drawings and pointed out in the appended claims.

Figure 1 is a plan view of a vehicle chassis with the signal attached thereto;

Fig. 2 is a front view;

Fig. 3 is a rear view; and

Fig. 4 is a perspective view of the signal supports illustrating the light reflector.

Referring more particularly to the accompanying drawings, the chassis of a motor vehicle is here indicated by the character 5, to which the signal denoted generally by the character 6 is attached. Mounted on the vehicle, and here shown as the radiator thereof, is a forward indicator 7, and on the rear of the machine is secured a rear indicator 8. Each of the indicators in this particular instance embodies a housing 9 of substantially keystone shape and the housing is secured to its respective part of the machine by the provision on the lower edge thereof of tabs 10, but if so desired the forward indicator may be provided at its upper end with a clip to fit around the filling opening of the radiator. These housings are preferably stamped from a single blank of material such as metal or the like with the front portion 11 arranged in spaced parallelism with the back portion 12 for swingingly supporting between the confronting faces of the front and back sections of each housing and on the shaft 13 a visible signal 14. Keyed or splined upon the shaft 13 of each of the indicators is a pulley 15 over which is trained a cable 16, said cable in turn being further trained over pulleys 17 arranged on the opposite ends of the drive shaft 18. The drive shaft is journaled in suitable brackets and is arranged in a longitudinal plane with respect to the frame or chassis and has mounted thereon at a point between the end pulleys thereof an intermediate pulley 19 operatively connected with the pulley 20 of the operating post 21, whereby upon the operator of the machine turning the handle 22 in one direction, will in turn rotate the drive shaft 18 and through its connection with the visible signals will in turn operate the latter exteriorly of and in a horizontal position with respect to the housing, for indicating to the parties ahead of the machine as well as in the rear of the same, that the operator is making or is about to make a turn either to the right or to the left. Each of the visible signals, that is, the signal at the front and the signal at the rear of the machine for the purpose of illustrating one preferred embodiment of signal is here shown as of substantially V-shaped form having its diverging portions 23 terminating in the form of a human hand, while the connecting portion 24 of the visible signal is centrally provided with a socket 25 in which an illuminating element, here shown as an electric bulb, is screwed and designated by the character 26.

These visible signals may be constructed of any material so desired, but preferably metal, and the marginal edge of the connecting portion 24 of each of said signals is bent in a forward direction to provide a substantially semi-circular reflector 27 arranged at right angles with the plane of the diverging arms 23 of the visible signals and having an open front 28 and an open bottom portion 29, consequently upon the inactive position of the visible signal the rays of light from the bulb 26 will be reflected in the path of travel of the car, while upon the operation of the visible signals to indicating position, will cause the swinging of the lower open end 29 of the reflector in alinement with the spaced sides 30 of the housing in order that the reflection from the light will be drawn on the arm of the visible signal assuming indicating position. Manifestly, a construction of this character will warrant the signal in being utilized for a night signal as well as a day signal. The front wall or facing of each of the housings is provided at its upper end with a casing 31, serving as a housing for the flange, pulley 15 and electric bulb 26.

From the foregoing description, taken in connection with the accompanying drawings, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claims.

What is claimed as new, is:—

1. In an automobile signal, the combination with a vehicle, of a visible indicator mounted on the front and rear ends of the vehicle, and means for operating the visible indicators from a vertical to a horizontal position, said means comprising a drive shaft, a pulley on the opposite ends and intermediate portion of said drive shaft, a cable passing over the end pulleys of the drive shaft and over a pulley of the visible indicator, a post, a pulley on said post, and a cable trained around the pulley of the post and the intermediate pulley of the drive shaft for imparting movement to said shaft in opposite directions.

2. An automobile signal embodying a pair of housings having open opposite sides, a shaft passing through the upper end of said housing, a substantially V-shaped visible indicator on said shaft, means for swinging the V-shaped visible indicator through the opposite open sides of the housing, illuminating means for said visible indicator, and means fixedly secured to the upper end of the V-shaped indicator for reflecting the rays of light through the open sides of the housing and on the indicator upon the swinging of the latter to indicating position.

3. An automobile signal embodying a pair of housings having open opposite sides, a shaft passing through the upper end of said housing, a substantially V-shaped visible indicator on said shaft, means for swinging the V-shaped visible indicator through the opposite open sides of the housing, illuminating means for said visible indicator, a shield fixedly secured to the end of the visible indicator provided in the bottom thereof with an opening, the opening in the bottom of the shield alining with the indicator for projecting the rays of light through its opening and upon the visible indicator when the latter is swung to indicating position.

In testimony whereof I affix my signature.

BUREN MOAD.